United States Patent [19]

Dechape

[11] Patent Number: 4,752,917

[45] Date of Patent: Jun. 21, 1988

[54] MEASUREMENT SYSTEM USING SONIC AND ULTRASONIC WAVES

[76] Inventor: Michel L. Dechape, 19963 Schoolhouse Ct., Northville, Mich. 48167

[21] Appl. No.: 874,616

[22] Filed: Jun. 16, 1986

[51] Int. Cl.[4] .......................................... G01N 29/00
[52] U.S. Cl. ..................................... 367/125; 73/597
[58] Field of Search .................. 73/597; 367/118, 124, 367/125, 99, 100, 902

[56] References Cited

U.S. PATENT DOCUMENTS

| 3,121,955 | 2/1964 | King | 73/597 |
| 4,210,969 | 7/1980 | Massa | 367/902 |
| 4,231,260 | 11/1980 | Chamuel | 73/597 |
| 4,494,224 | 1/1985 | Morrell et al. | 367/99 |

OTHER PUBLICATIONS

IBM Technical Disclosure Bulletin, vol. 27, No. 3, Aug. 1984, F. R. Koperda & Vandenberg, Ultrasonic Pos. Indic.

Primary Examiner—Stewart J. Levy
Assistant Examiner—Louis M. Arana
Attorney, Agent, or Firm—Gifford, Groh, VanOphem, Sheridan, Sprinkle and Dolgorukov

[57] ABSTRACT

In a displacement measurement system using waves in the sonic to ultrasonic range, a constant wavelength of the sonic or ultrasonic wave is established by driving the wave transmitter by a variable frequency oscillator whose frequency is varied as a function of a control voltage. The control voltage is varied as a function of the phase differential between the wave transmitted by the transmitter and the wave received by reference receiver to maintain both waves in phase.

7 Claims, 1 Drawing Sheet

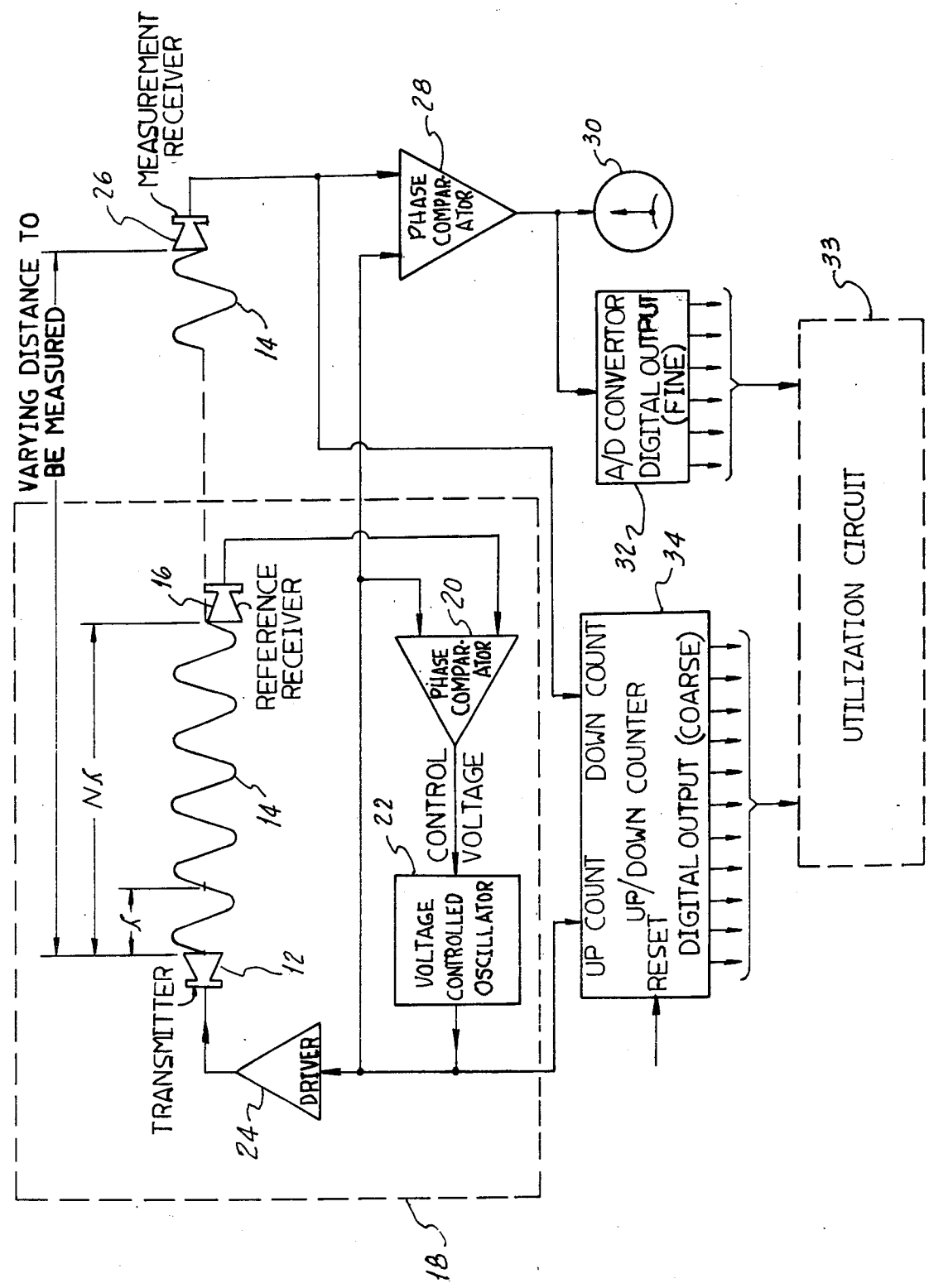

MEASUREMENT SYSTEM USING SONIC AND ULTRASONIC WAVES

BACKGROUND OF THE INVENTION

The present invention relates to precision measurement systems in general, and more particularly to a distance or displacement measurement system using sonic or ultrasonic waves.

Distance measurement systems are known wherein a burst of sonic or ultrasonic waves is emitted by a transmitter, and the time taken by the waves to reach a receiver or be reflected back to the point of origin is measured such as to provide an indication of the distance between the transmitter and the receiver, or between the transmitter and the reflector.

Sonic or ultrasonic continuous wave systems are also known. In continuous wave systems, an emitter or transmitter produces a sonic or ultrasonic wave signal at a known frequency, and a receiver located at some distance away from the transmitter detects the sonic or ultrasonic wave. The change in phase relationship between the wave signal emitted by the transmitter and the wave signal received by the receiver, and the number of phase reversals (360° phase shift) provides an indication of the relative displacement when either the transmitter or the receiver, or both, are moved.

One of the problems involved in utilizing sonic or ultrasonic waves to measure distances or relative displacement between a transmitter and a receiver is that the measurement of the distance or displacement is subject to considerable inaccuracies due to variations in the speed of sound resulting from changes in ambient temperature, atmosperic pressure, humidity, etc. For example, a 10° C. change in temperature of the atmosphere causes a 1.7% change in the speed of sound, therefore a 1.7% error in the distance being measured, unless the change in temperature is taken into consideration. When it is desired to provide accurate positioning of a machine tool table, or of a robot arm, or when accurate measurements of displacements are required, sonic or ultrasonic wave technology is precluded, unless certain precautions are taken.

For example, either the environment in which the measuring system operates must be closely controlled, or some correction factors msut be introduced into the system for compensating for some of the known predictable effects of the environment. However, even with the use of costly accurate sensors for monitoring the actual environment, and extensive and complex circuitry to provide the proper amount of correction, it is rather difficult to achieve the accuracy and stability required for the positioning of components under the control of numerical control units (N/C units), as is presently done with shaft encoders, resolvers, synchros, inductrosyns, and linear glass scales.

The sonic or ultrasonic wave is a sinusoidal pressure variation of the air or fluid in which the sonic or ultrasonic wave is traveling at the speed of sound. The speed of sound in the air or fluid in which the wave is propagated depends in turn on the type of fluid, its pressure, and its temperature. A continuous sonic or ultrasonic wave has a wavelength λ which is related to the speed of sound and the frequency of the wave according to the following equation:

$$\lambda \text{ (in meter)} = \frac{\text{speed of sound (in meters/second)}}{\text{frequency (in Hz)}}$$

From this basic equation, it is clear that a change either in the frequency of the wave or in the speed of sound causes a change in the wavelength. In order to achieve accurate measurements of distance and displacement, a precisely known and stable wavelength is required. A constant wavelength can be obtained by changing the frequency of the wave as a function of the change in the speed of sound due to the effect of the environment.

SUMMARY OF THE INVENTION

The principal object of the invention is to provide a system utilizing sonic or ultrasonic waves for accurately measuring distance or displacement in spite of the effect of the environment on the speed of sound. A further object of the invention is to provide a sonic or ultrasonic distance or displacement measurement system wherein a constant wavelength of the sonic or ultrasonic wave is maintained, irrespective of variations in the environment.

The invention achieves its objects by providing means for changing the frequency of the sonic or ultrasonic wave as a function of the change in the speed of sound.

The diverse objects and advantages of the invention will become apparent to those skilled in the art when the following description of the best mode contemplated for practicing the invention is read in conjunction with the accompanying drawing, wherein:

BRIEF DESCRIPTION OF THE DRAWING

The sole FIGURE of the drawing is a schematic diagram of an arrangement, according to the present invention, for obtaining accurate measurements of distance or displacement by using sonic or ultrasonic waves.

DETAILED DESCRIPTION OF THE PREFERRED EMBODIMENT

Referring to the drawing, a sonic or ultrasonic wave transmitter 12, for example in the form of a piezoelectric ceramic element, or the like, generates a sonic or ultrasonic wave 14 that travels through an appropriate medium, such as atmospheric air for example. The sonic or ultrasonic wave 14 has a wavelength λ which is a function of the wave frequency and the speed of sound.

The frequency ranges extend from the audio spectrum to the ultrasonic spectrum, for example from 1 KHz to 500 KHz, but once an operating frequency is chosen, the variation of that frequently to compensate for the variation of the speed of sound needs only be ±5%. Although piezoelectric ultrasonic transducers are highly frequency selective, they operate very well within the limits of ±5% of their center frequency.

The transmitter 12, and the reference receiver 16 disposed at an integral number of wavelengths, Nλ, away from the transmitter 12, form part of a closed loop circuit 18 which, in addition, comprises a phase comparator 20 and a voltage controlled oscillator 22. The frequency of the signal at the output of the voltage controlled oscillator 22 is variable as a function of a control voltage applied to its input by the phase comparator 20.

The voltage controlled oscillator 22 drives the transmitter 12 through a driver 24. The signal at the ouput of the voltage controlled oscillator 22 is also applied to an input of the phase comparator 20, in which the phase of the signal at the output of the voltage controlled oscillator 22 is compared to the phase of the signal at the output of the reference receiver 16 which is applied to the other input of the phase comparator 20. As long as the signals are in phase, the control voltage at the output of the phase comparator 20 applied to the input of the voltage controlled oscillator 22 remains at a constant stable level. However, when the phase comparator 20 detects a minute difference in phase between the signal at the output of the voltage controlled oscillator 22 and the signal at the output of the reference receiver 16, the control voltage applied by the phase comparator 20 to the input of the voltage controlled oscillator 22 varies, thus causing a variation of the frequency of the signal at the output of the voltage controlled oscillator 22, that is the frequency of the wave 14 radiated by the transmitter 12, to restore the in-phase condition.

For example, if the system operates at a frequency of 34.3 KHz, and assuming a normal ambient temperature of 20° C., the piezoelectric ultrasonic transmitter 12 generates a sound wave having a wavelength of 1 cm. By placing the reference receiver 16 at an integral number of wavelengths, 1 to 20 for example, away from the transmitter 12, the wave signal received at the reference receiver 16 is delayed by 1 to 20 cycles, but is otherwise in phase with the wave signal emitted by the transmitter 12. An increase in ambient temperature causes the speed of sound to increase, and the signal received by the reference receiver 16 tends to be leading the emitted signal. The phase comparator 20 provides a higher control voltage to the voltage controlled oscillator 22, which causes the voltage controlled oscillator 22 to increase the frequency of its output signal in order to maintain an in-phase condition between the signal emitted by the transmitter 12 and that received by the reference receiver 16. If the speed of sound decreases, for example as a result of a decrease in ambient temperature, or for any other reason, the signal received by the reference receiver 16 tends to be lagging the signal emitted by the transmitter 12, and the phase comparator 20 provides a lower control voltage, in turn causing the voltage controlled oscillator 22 to decrease the frequency of its output signal in order to still maintain an in-phase condition between the transmitted signal and the received signal at the reference receiver 16.

The closed loop circuit 18 thus generates at the output of the transmitter 12 a sound wave of known constant wavelength which propagates in space providing an invisible constant scale which can be used to measure distances or displacements by mounting a measurement receiver 26 to an element whose position relative to the transmitter 12 is to be determined.

The signal at the output of the measurement receiver 26 is applied to an input of a phase comparator 28 in which it is compared to the signal at the output of the voltage controlled oscillator 22, which is applied to the other input of the phase comparator 28. Thus, a fine measurement, i.e. within one wavelength, of the position of the measurement receiver 26 is accurately determined by the phase comparator 28 which provides a linear output proportional to the phase relationship between the signal received by the measurement receiver 26 and the signal at the output of the voltage controlled oscillator 22. Comparing the phase of the signal received by the measurement receiver 26 to that of the signal emitted by the transmitter 12 can provide measurement resolution in the micron range. The fine measurement signal, or phase differential signal, is applied from the output of the phase comparator 28 to an analog visual display 30, and/or to an analog-digital converter 32 which provides a fine measurement digital output to an appropriate utilization circuit 33. The utilization circuit 33 may take several forms, such as an N/C control feedback loop, or a digital numerical display, for example, or both.

Coarse distance or displacement measurement between the transmitter 12 and the measurement receiver 26 can be effected by a diversity of electronic circuits. An example is illustrated in the drawing comprising an up/down counter 34 connected to the output of the measurement receiver 26 and to the output of the voltage controlled oscillator 22. In order to effectuate a measurement, a zero reference is established, for example by placing the measurement receiver 26 to a known distance from the transmitter 12. Every pulse at the output of the voltage controlled oscillator 22, that is every cycle of the signal driving the transmitter 12 produces an up count in the counter 34, and every cycle received by the measurement receiver 26 produces a down count in the counter 34. As the measurement receiver 26 is displaced away from the transmitter 12, one less cycle is down counted by the up/down counter 34 each time the measurement receiver 26 is displaced by a distance corresponding to one wavelength away from the transmitter 12. Conversely one more cycle is down counted by the up/down counter 34 each time the measurement receiver 26 is moved closer to the transmitter 12 by one wavelength. As the wavelength of the signal propagated in the medium, such as the atmosphere, by the transmitter 12 has a constant wavelength, as provided by the closed loop circuit 18, the exact distance to which the measurement receiver 26 is displaced from the transmitter 12, in internal numbers of wavelengths, or centimeters, can be determined with accuracy from one centimeter to several meters. The up/down counter 34 provides in a digital form at its output a count which is the difference between the cycles generated by the transmitter 12 and the cycle received by the measurement receiver 26, therefore an indication of the distance to which the measurement receiver 26 has been displaced from the zero reference. The count at the output of the up/down counter 34 can also be applied to the utilization circuit 33 to provide a coarse measurement, in integral numbers of centimeters, of the displacement of the measurement receiver 26 from the zero reference point.

Having thus described the present invention by way of an example of structure well-designated for accomplishing the objects of the invention, modification whereof will be apparent to those skilled in the art, what is claimed as new is as follows:

I claim:

1. An apparatus for measuring the displacement of an object between a first position and a second position comprising:

means for transmitting a wave signal through a fluid medium, said wave signal having a predetermined wavelength, said predetermined wavelength being determined as a function of the ratio of the speed of sound in the fluid medium to the frequency of the wave signal the speed of sound varying in response to changes in ambient conditions of the fluid medium;

means for receiving said wave signal mounted on said object and spaced apart from said means for transmitting, a reference receiver mounted in said fluid medium for receiving said wave signal, said reference receiver mounted a predetermined distance from said means for transmitting;

a first phase comparator for comparing the phase of said wave signal received by the said reference receiver with the phase of said wave signal transmitted by the means for transmitting, said first phase comparator and producing a control voltage responsive to the comparison of the phases;

a voltage controlled oscillator driving said means for transmitting in response to said control voltage from said first phase comparator whereby said wave signal transmitted by said means for transmitting and said wave signal received by said reference receiver are maintained in phase despite variations of the speed of sound occurring as a result of variations in ambient conditions of said fluid medium;

a second phase comparator for comparing the phase of said wave signal received by said means for receiving and the phase of said wave signal transmitted by said means for transmitting, said second phase comparator producing an analog output responsive to the comparison of the phase difference; and means for converting said analog output of said second phase comparator to a first digital output for measuring a displacement of said object.

2. The apparatus of claim 1 further comprising;

means for producing a second digital output indicating the number of integral wavelengths of said wave signal separating said means for transmitting and said means for receiving at any particular time.

3. The apparatus of claim 2, wherein said means for producing further comprises an up/down counter.

4. The apparatus of claim 2, further comprising a utilization circuit for displaying the displacement of said object responsive to said first digital output and said second digital output.

5. The apparatus of claim 1, wherein said fluid medium comprises a gas.

6. The apparatus of claim 1, wherein said means for transmitting further comprises a piezoelectric ceramic element.

7. The apparatus of claim 1, wherein said predetermined distance comprises a distance equivalent to a plurality of whole wavelengths of said wave signal.

* * * * *